(12) United States Patent
Kracke

(10) Patent No.: US 12,066,108 B2
(45) Date of Patent: Aug. 20, 2024

(54) ROTARY SEALS

(71) Applicant: Goodrich Actuation Systems Limited, Solilhull (GB)

(72) Inventor: Jeremy Kracke, Stone (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 0 days.

(21) Appl. No.: 17/164,978

(22) Filed: Feb. 2, 2021

(65) Prior Publication Data

US 2021/0239218 A1      Aug. 5, 2021

(30) Foreign Application Priority Data

Feb. 4, 2020   (EP) ..................................... 20275025

(51) Int. Cl.
*F16J 15/3284*      (2016.01)

(52) U.S. Cl.
CPC ................ *F16J 15/3284* (2013.01)

(58) Field of Classification Search
CPC ...... F16J 15/16; F16J 15/3268; F16J 15/3284; F16J 15/3276; F16J 15/3464
See application file for complete search history.

(56) References Cited

U.S. PATENT DOCUMENTS

| | | | |
|---|---|---|---|
| 3,275,334 A | 9/1966 | Voitik | |
| 3,368,819 A | 2/1968 | Otto | |
| 3,523,692 A * | 8/1970 | Otto | F16J 15/3456 |
| | | | 277/386 |
| 4,776,600 A * | 10/1988 | Kohn | F16L 23/18 |
| | | | 285/48 |
| 4,852,890 A | 8/1989 | Borowski | |
| 5,024,450 A | 6/1991 | Hawley et al. | |
| 6,113,105 A * | 9/2000 | Johnson | F16J 15/4474 |
| | | | 277/412 |
| 2018/0010680 A1 | 1/2018 | Davies | |
| 2019/0032785 A1 | 1/2019 | Edmond et al. | |

FOREIGN PATENT DOCUMENTS

| | | |
|---|---|---|
| DE | 3714084 A1 | 11/1988 |
| FR | 936483 A | 7/1948 |

OTHER PUBLICATIONS

Extended European Search Report for International Application No. 20275025.3 dated Aug. 11, 2020, 8 pages.

* cited by examiner

*Primary Examiner* — Gilbert Y Lee
(74) *Attorney, Agent, or Firm* — CANTOR COLBURN LLP

(57) ABSTRACT

A rotary seal comprises includes a first annular element, a second annular element and a seal element. The first annular element has a first axially extending flange and a first radially extending flange extending radially from a proximal end of the first axially extending flange. The second annular element has a second axially extending flange and a second radially extending flange extending radially from a proximal end of the second axially extending flange in the same direction as the first radially extending flange. The second annular element is fixed to the first annular element, the second axially-extending flange being received radially on the first axially-extending flange. The second radially extending flange is spaced axially from the first radially extending flange to define a pocket therebetween.

15 Claims, 3 Drawing Sheets

ROTARY SEALS

FOREIGN PRIORITY

This application claims priority to European Patent Application No. 20275025.3 filed Feb. 4, 2020, the entire contents of which is incorporated herein by reference.

TECHNICAL FIELD

The present disclosure relates to rotary seals as may be used to seal the gap between two relatively rotating members such as a rotating shaft and a static housing.

BACKGROUND

Rotary seals commonly comprise a pair of lip seals running on a sleeve fitted to a shaft. The lip seals require a hard bearing surface, necessitating the use of a bearing sleeve. Moreover the lip seals are typically crimped into the housing which is time consuming in assembly of the seal.

SUMMARY

From a first aspect, the present disclosure provides a rotary seal comprising a first annular element, a second annular element and a seal element. The first annular element has a first axially extending flange and a first radially extending flange extending radially from a proximal end of the first axially extending flange.

The second annular element has a second axially extending flange and a second radially extending flange extending radially from a proximal end of the second axially extending flange in the same direction as the first radially extending flange. The second annular element is fixed to the first annular element, the second axially-extending flange being received radially on the first axially-extending flange and the second radially extending flange being spaced axially from the first radially extending flange to define a pocket therebetween. The seal element is located in the pocket axially between the first radially extending flange and the second radially extending flange. It makes a first sealing engagement against a first surface of the first radially extending flange and a second sealing engagement against a second surface of the second radially extending flange axially opposed to the first surface of the first radially extending flange.

In an embodiment of the above, the first radially extending flange and the second radially extending flange may extend radially inwardly. In an alternative embodiment, however, they may extend radially outwardly.

In embodiments of any of the above embodiments, the second axially extending flange may be received with an interference fit with the first axially extending flange for fixing the second annular element to the first annular element. In other arrangements however, other forms of fixing may be used.

In embodiments of any of the above embodiments, the first sealing engagement may comprise a first raised lip formed on one of the seal element and the first radially extending flange.

The first raised lip may be formed on the seal element. It may be formed adjacent a surface of the seal element facing towards the first and second axially extending flanges.

In embodiments of any of the above embodiments, the second sealing engagement may comprise a second raised lip on one of the seal element (and the second radially extending flange.

The second raised lip may be formed on the second radially extending flange, optionally adjacent a distal end thereof.

In embodiments of any of the above embodiments, the seal element may further comprise an annular groove extending from a surface facing towards the first and second axially extending flanges. An annular energiser may be located within the annular groove for energising the first sealing engagement.

The annular energiser may be an elastomeric O-ring.

In embodiments of any of the above embodiments, the seal element may comprise a second annular groove on a surface facing away from the first and second annular elements. An O-ring seal may be received within the second annular groove.

In embodiments of any of the above embodiments, the first axially extending flange may comprise a third annular groove on a surface facing away from the seal element. A second O-ring seal may be received within the third annular groove.

Embodiments of any of the above embodiments may further comprise a reaction engagement formed between the seal element and one of the first and second radially extending flanges. Optionally the reaction engagement may be positioned generally opposite the sealing engagement of the seal element with the other of the first and second radially extending flanges. The reaction engagement may optionally comprise a third raised lip formed on one of the seal element or the one of the first and second radially extending flanges.

In embodiments of any of the above embodiments, the seal element may be spaced radially from the first and second axially extending flanges of the second annular element.

In embodiments of any of the above embodiments, the seal element may be made from PTFE, filled PTFE or PEEK.

The disclosure also provides a rotary assembly comprising a rotary element, a static element and a rotary seal in accordance with the disclosure mounted between the static element and the rotary element.

BRIEF DESCRIPTION OF DRAWINGS

An embodiment of the disclosure will now be described by way of example only with reference to the accompanying drawings in which.

DETAILED DESCRIPTION

Figure 1:
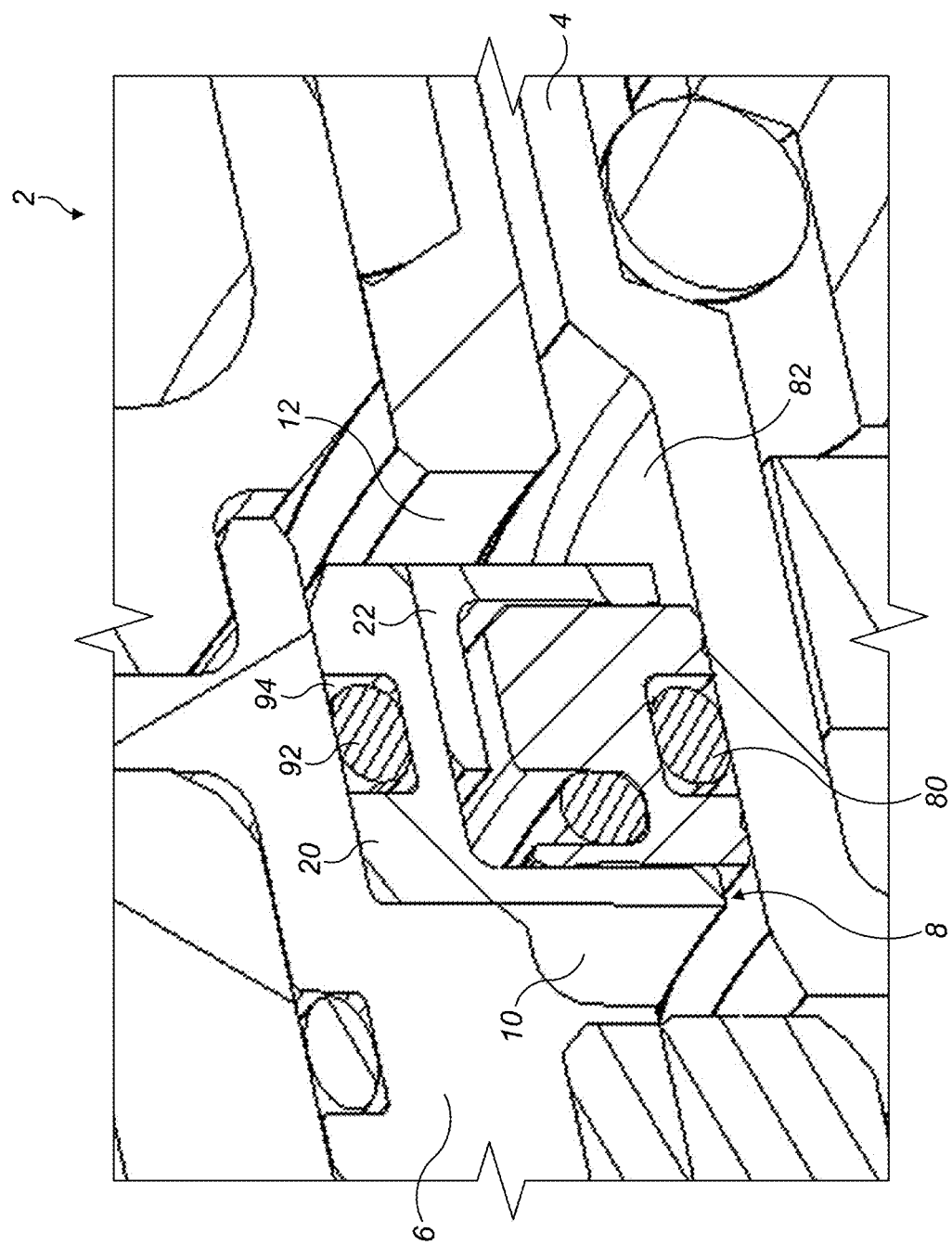
FIG. 1 shows a perspective cross section of a rotary assembly incorporating a rotary seal in accordance with the disclosure.
Figure 2:
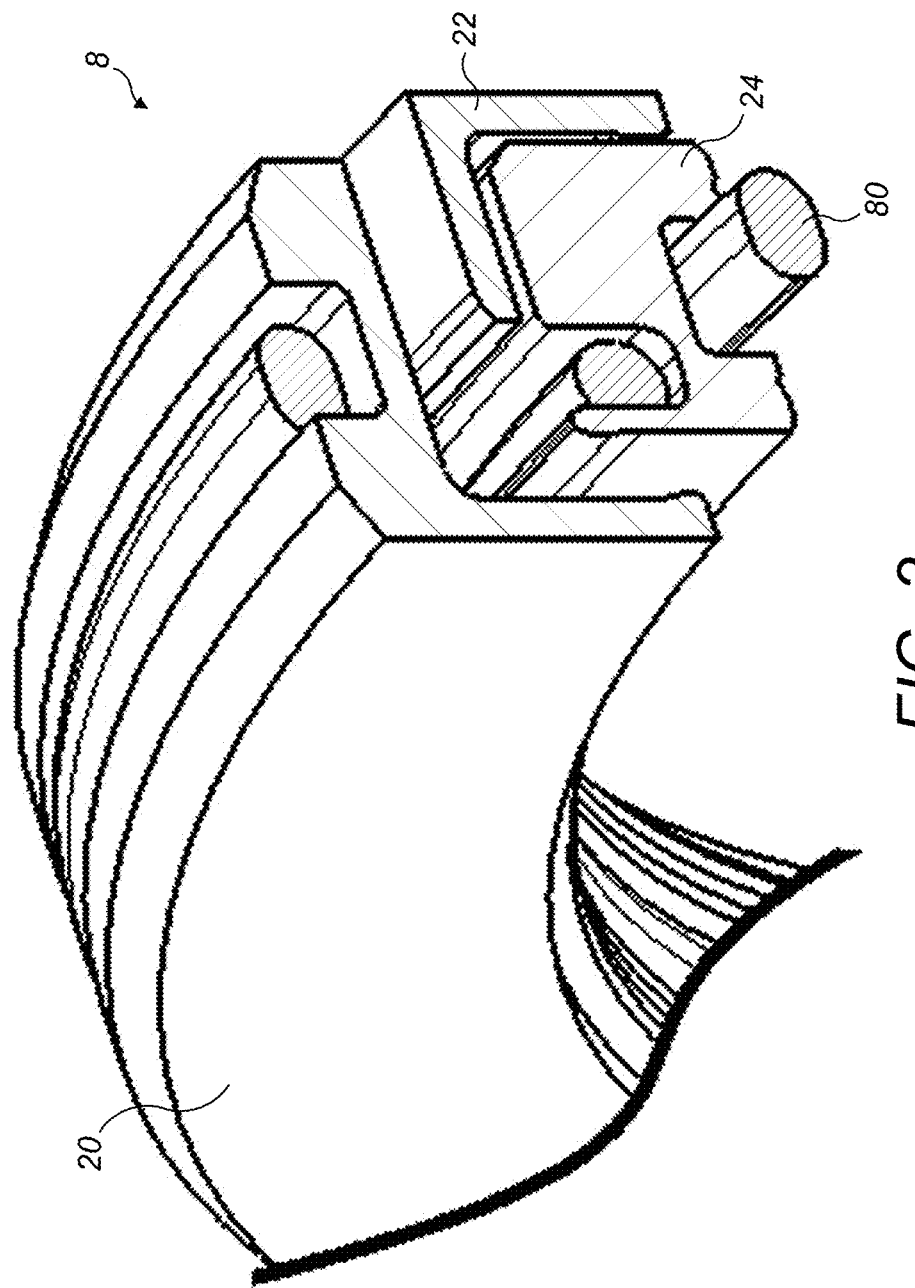
FIG. 2 shows a perspective sectional view of the rotary seal of FIG. 1.

With reference to FIG. 1, a rotary assembly 2 comprises a rotary element 4 for example a shaft and a second element 6 with respect to which the rotary element 4 rotates. The rotary element 4 is supported for rotation by one or more bearings (not shown). The second element 6 may, in some embodiments be a static element. In other embodiments it may be a second rotary element, but one which rotates at a different speed from the rotary element 4. A rotary seal 8 is located radially between the rotary element 4 and the static element 6 and seals a first cavity 10 formed on one axial side of the rotary seal 8 from a second cavity 12 formed on another side of the rotary seal 8. The first cavity 10 and second cavity 12 may contain different fluids. For example in some embodiments the first cavity 10 may be an oil side cavity, in fluid communication with a supply of oil, and the second cavity 12 may be an air side cavity in fluid communication with air, for example ambient air. The rotary seal 8 prevents or reduces the flow of fluids from the first cavity 10 to the second cavity 12 while allowing the rotary element 4 to rotate.

The rotary seal 8 comprises three main parts, namely a first annular element 20, a second annular element 22 and an annular seal element 24. The first annular element 20 and the second annular element 22 may be formed from a metallic material such as steel. The seal element 24 may be formed from an elastomeric material, for example PTFE, filled PTFE or PEEK. The first annular element 20 may easily be formed by turning for example. The second annular element 22 may also easily be formed by turning for example. The seal element 24 may be moulded and turned if necessary.

The first annular element 20 is generally L-shaped in vertical cross section (as can be seen from FIG. 3 for example) and comprises a first axially extending flange 26 and a first radially extending flange 28 extending radially inwardly from a proximal end 30 of the first axially extending flange 20.

The second annular element 22 is also generally L-shaped in vertical cross section (as can also be seen from FIG. 3) and comprises a second axially extending flange 32 and a second radially extending flange 34 extending radially inwardly from a proximal end 36 of the second axially extending flange 32.

The second annular element 22 is fixed to the first annular element 20 with the second axially-extending flange 32 being received radially within the first axially-extending flange 26. The outer diameter OD of the second axially extending flange 32 may be slightly larger than the inner diameter ID of the first axially extending flange 26 such that the second axially-extending flange 32 is received with an interference fit within the first axially-extending flange 26, thereby fixing the second annular element 22 to the first annular member 20. In other embodiments, the second axially-extending flange 32 may be received within the first axially-extending flange 26 with a sliding fit, and the second annular element 22 be fixed to the first annular element by other means, such as a braze 38, or by some other mechanical fastening. The distal end 40 of the second axially extending flange 32 may have a chamfer 42 to facilitate assembly of the second annular element 22 to the first annular element 20.

The second axially extending flange 32 is arranged radially between the first radially extending flange 28 and the second radially extending flange 34. The second radially extending flange 34 is spaced axially from the first radially extending flange 28 to define an annular generally U-sectioned seal-receiving pocket 44. The radially outer boundary of the pocket 44 is formed by the first axially extending flange 26 and the second axially extending flange 32. The respective axial boundaries of the pocket are formed by the first radially extending flange 28 and the second radially extending flange 34.

The seal element 24 is received within the pocket 44 and sandwiched axially between the first radially extending flange 28 and the second radially extending flange 34. A first axial side 46 of the seal element 24 makes a first sealing engagement 48 against a first radially extending surface 50 of the first radially extending flange 28. A second axial side 52 of the seal element 24 makes a second sealing engagement 54 against a second radially extending surface 56 of the second radially extending flange 34, axially opposed to the first radially extending surface 50 of the first radially extending flange 28.

In this embodiment, the first sealing engagement 48 comprises a first axially raised lip 58 formed on the first axial side 46 of the seal element engaging with the first radially extending surface 50 of the first radially extending flange 28, which is planar. The first lip 58 may be smoothly rounded or include a flattened portion for engagement with the first radially extending surface 50. In other embodiments the first lip 58 may be formed on the first radially extending surface 50 instead.

The first lip 58 in this embodiment is formed adjacent the radially outer surface 60 of the seal element 24 towards the first and second axially extending flanges 26, 32. As can be seen most clearly from FIG. 3, the radially outward surface 60 of the seal element 24 comprises a first annular groove 62 which extends radially inwardly beyond the first lip 58. The first lip 58 is therefore in effect formed on a radially outwardly extending flange 64 of the seal element 24 defined by the annular groove 62. An energising ring 66 is received within the first annular groove 62 and acts to energise the first sealing engagement 48. In this embodiment, the energising ring 66 is a simple elastomeric O-ring, although it may take other forms such as a finger spring, garter spring or the like. Also, while the first annular groove 62 is shown as being generally U-shaped in cross section, in other embodiments it may have a different shape, for example a V-shaped cross section. In some embodiments, if the seal element is sufficiently resilient, the energising ring 66 may not be required.

The second sealing engagement 54 in this embodiment is comprises a second axially raised lip 68 formed on the second radially extending surface 56 of the second radially extending flange 34 and the second axial side 52 of the seal element 24, which is planar. The second lip 68 may be smoothly rounded or include a flattened portion for engagement with the second axial side 52 of the seal element 24. In other embodiments the second lip 68 may be formed on the second axial side 52 of the seal element 24 instead. In this embodiment, the second lip 68 is formed adjacent a distal end 69 of the second radially extending flange 34.

In addition to the first and second sealing engagements 48, 54 between the seal element 24 and the first and second annular elements 20, 22, there may also be a reaction engagement 70 therebetween. Such a reaction engagement 70 is illustrated most clearly in FIG. 3. In this embodiment, the reaction engagement 70 is between a third axially raised lip 72 formed on the first radially extending surface 50 of the first radially extending flange 28 and the first axial side 46 of the seal element 24. In other embodiments, the third lip 72 could be formed on the first axial side 46 of the seal element 24 instead. In other embodiments, no third lip 72 may be provided. The reaction engagement is provided adjacent the radially inner end 74 of the first radially extending flange 28. It is generally opposite the second sealing engagement 54 so that the seal element 24 is generally clamped axially between the third lip 72 and the second lip 68. In effect, the third lip 72 limits the distance that the second annular element 22 may be inserted into the first annular element 22 during assembly. The reaction engagement 70 is configured such that it does not interfere with the first sealing engagement 48.

It will be seen that the seal element 24 further comprises a second annular groove 76 on radially inner surface 78, for example generally midway axially of the seal element 24 as shown. An O-ring seal 80 is received within the second annular groove 76. As can be seen in FIG. 1, the O-ring seal 80 makes sealing contact with the radially outer surface 82 of the rotary element 4. The rotary element 4 is not provided with a bearing sleeve as in the prior art, as the seal of the present disclosure may not require one to be present.

The walls 84 defining the second groove 76 may be formed with shallow circumferentially extending grooves 86. These grooves 86 aid conformity and assembly of the seal to the rotary or static element. In some embodiments, the O-ring seal 80 may not be required and the radially inner surface 78 of the seal element may be sufficient to make a seal with the rotary element 4.

The first axially extending flange 26 of the first annular element 20 comprises a third annular groove 88 on its radially outer surface 90 facing away from the seal element 24. A second O-ring seal 92 is received within the third annular groove 88. As can be seen in FIG. 1, the second O-ring seal 92 makes sealing contact with a radially inner surface 94 of the static element 6, to prevent leakage of fluid from the first cavity 10 to the second cavity 12 around the radially outer edge of the seal 8. In some embodiments, the second O-ring 92 (and third annular groove 88) may be omitted and the sealing of the seal within the static element 6 be achieved in some other manner, for example by adhering the seal 8 to the static element 6.

Returning to FIG. 3, it can be seen that a seal cavity 96 is formed between the first annular element 20, the second annular elements 22 and the seal element 24. This seal cavity 96 is advantageous in that it will allow for the accumulation of fluid, for example oil, which may leak into the seal 8 from the first cavity 10 through the first sealing engagement 48 and thus potentially prevent or reduce the passage of oil into the second cavity 12.

Figure 3:
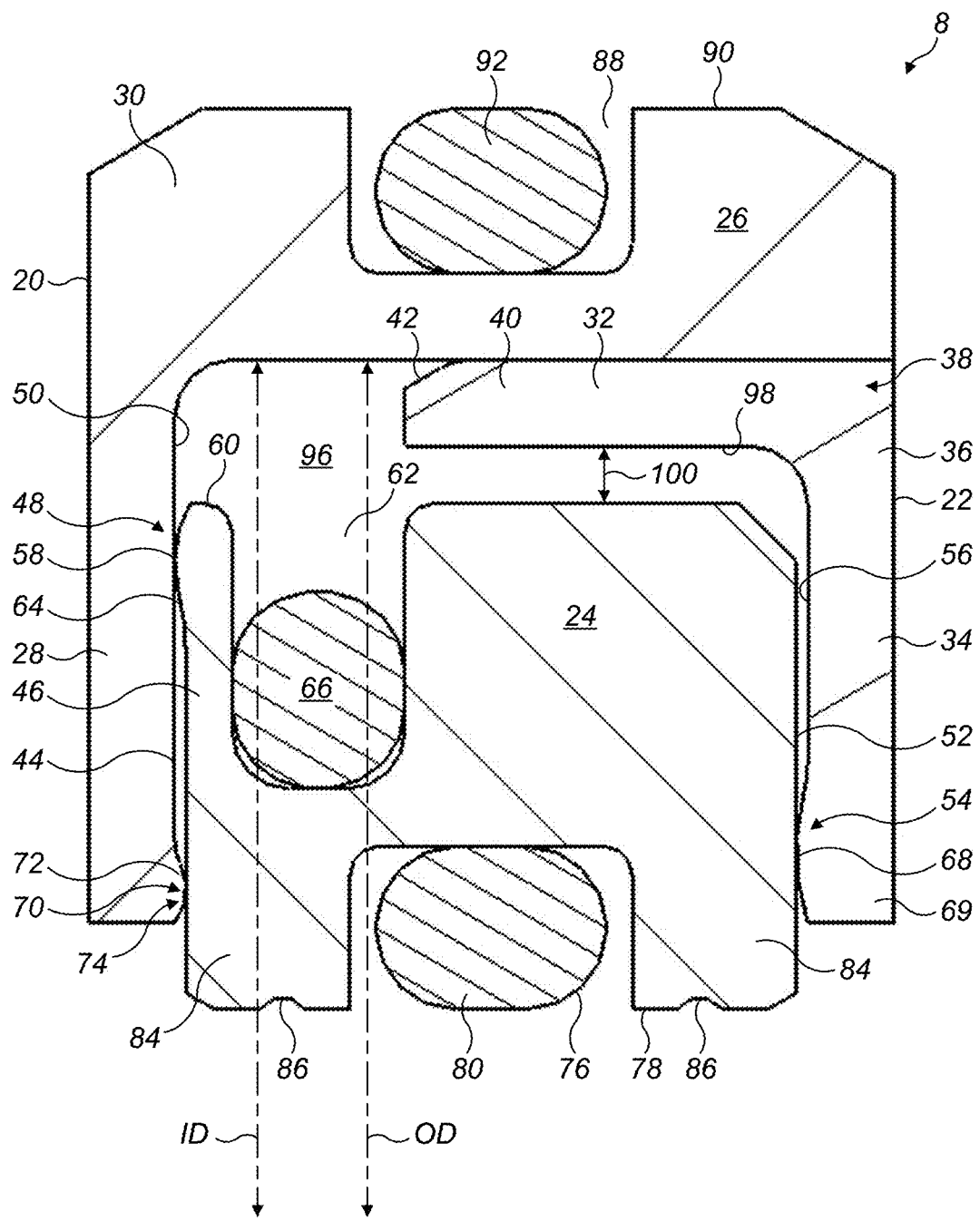
FIG. 3 shows a sectional view through rotary seal of FIG. 1.

It will also be seen from FIG. 3, that the radially outward surface 60 of the seal element 24 is radially spaced from the radially inner surface 98 of the second axially extending flange 32 by a spacing 100. This is not essential, but it facilitates assembly of the seal 6 and increases the size of the seal cavity 96. It also allows for some degree of radial misalignment between the seal element 24 and the other elements 20, 22.

Having described the construction of the seal 6, its assembly will now be described.

As a first step the seal element 24 may be assembled, with the energiser 66 inserted into the first groove 62. The O-ring seal 80 may be inserted into the second groove 76 at this stage or later.

The seal element 24 is then inserted into the first annular element 20, and the second annular element 22 then mounted to the first annular element 20 to locate the seal element 24. As discussed above, there may be an interference fit between the first and second annular elements 20, 22, in which case the second annular element will have to be press fitted and/or shrunk into the first annular element 20. Otherwise, the second annular element 22 can be simply slid into the first annular element 20.

The second annular element 20 is inserted axially into the first annular element 20 so as to make the first and second sealing engagements 48, 54. The axial movement of the second annular element 22 will be limited by the reaction engagement 70. If the second annular element 22 is not interference fitted with the first annular element 20, the second annular element 22 may be secured to the first annular element 20 for example by a braze 36.

The O-ring seals 80, 92 (if they are required) may then be inserted into their respective grooves 76, 88 and the seal 8 the assembled to the rotary and static elements 4, 6.

It will be seen that the embodiments of the disclosure may exhibit a number of advantages over the traditional lip seals discussed above.

Firstly, the seal 6 may accommodate relatively large radial misalignments due to the seal element being free to move radially between the annular seal elements 20, 22.

Secondly, the nature of the materials usable for the seal element may avoid the need for a dedicated bearing sleeve to be provided on a rotary element 4 against which the seal 6 seals.

In addition, the components may be easily manufactured (for example by turning and moulding) and assembled (for example by press fitting) and fitted to equipment without the need for specialised tooling.

Also, the use of a simple O-ring energiser 66, as opposed to more complex and/or metallic designs allows a reduction in cost and weight.

The construction may also reduce drag forces on the rotary element 4 due to the relative coefficients of thermal expansion of the seal. This is because the thermal contraction rate of the seal element 24 is greater than that of the metallic annular seal elements 20, 22 in which it is received. Thus as the seal 6 gets colder the clearances relative to the rotary element 4 will increase reducing the preload drag.

It will be apparent that modifications may be made to the embodiment described above without departing from the scope of the disclosure. For example while the embodiment shows the seal being used to separate an air side cavity 12 from an oil side cavity 10, the cavities 10, 12 may be reversed. Also, while the sealing element 24 has been shown as sealing against a radially outer surface 82 of a radially inner shaft 4, the arrangement may be inverted such that the radially inner element is static and the radially outer member is rotary. In this case the first and second radially extending flanges 28, 34 of the first and second annular elements 20, 22 would extend radially outwardly rather than radially inwardly as shown.

The invention claimed is:

1. A rotary seal comprising:
a first annular element having a first axially extending flange and a first radially extending flange extending radially from a proximal end of the first axially extending flange;
a second annular element having a second axially extending flange and a second radially extending flange extending radially from a proximal end of the second axially extending flange in the same direction as the first radially extending flange; wherein the second annular element is fixed to the first annular element, the second axially-extending flange being received radially on the first axially-extending flange and the second radially extending flange being spaced axially from the first radially extending flange to define a pocket therebetween;
a seal element located in the pocket axially between the first radially extending flange and the second radially extending flange and making a first sealing engagement against a first surface of the first radially extending flange and making a second sealing engagement against a second surface of the second radially extending flange axially opposed to the first surface of the first radially extending flange; and
a reaction engagement formed between the seal element and one of the first and second radially extending flanges, wherein the reaction engagement is axially directly opposite the sealing engagement of the seal element with the other of the first and second radially extending flanges, such that the first and second sealing engagements are not directly opposite each other, and the axial distance between the reaction engagement and the sealing engagement of the seal element with the other of the first and second radially extending flanges is a fixed distance and limits the distance that the second annular element may be inserted into the first annular element.

2. A rotary seal as claimed in claim 1, wherein the first radially extending flange the second radially extending flange extend radially inwardly.

3. A rotary seal as claimed in claim 1, wherein the second axially extending flange is received with an interference fit with the first axially extending flange for fixing the second annular element to the first annular element.

4. A rotary seal as claimed in claim 1, wherein the first sealing engagement comprises a first raised lip formed on one of the seal element and the first radially extending flange.

5. A rotary seal as claimed in claim 4, wherein the first raised lip is formed on the seal element, optionally adjacent a surface of the seal element facing towards the first and second axially extending flanges.

6. A rotary seal as claimed in claim 1, wherein the second sealing engagement comprises a second raised lip on one of the seal element and the second radially extending flange.

7. A rotary seal as claimed in claim 6, wherein the second raised lip is formed on the second radially extending flange, optionally adjacent a distal end thereof.

8. A rotary seal as claimed in claim 1, wherein the seal element further comprises an annular groove extending from its surface facing towards the first and second axially extending flanges, and an annular energiser located within the annular groove for energising the first sealing engagement.

9. A rotary seal as claimed in claim 8, wherein the annular energiser is an elastomeric O-ring.

10. A rotary seal as claimed in claim 1, wherein the seal element comprises a second annular groove on its surface facing away from the first and second annular elements, an O-ring seal being received within the second annular groove.

11. A rotary seal as claimed in claim 1, wherein the first axially extending flange comprises a third annular groove on its surface facing away from the seal element, a second O-ring seal being received within the third annular groove.

12. A rotary seal as claimed in claim 1, further comprising:
   the reaction engagement further comprising a third raised lip formed on one of the seal element or the one of the first and second radially extending flanges.

13. A rotary seal as claimed in claim 1, wherein the seal element is spaced radially from the first and second axially extending flanges of the second annular element.

14. A rotary seal as claimed in claim 1, wherein the seal element is made from PTFE, filled PTFE or PEEK.

15. A rotary assembly comprising:
   a rotary element;
   a static element; and
   a rotary seal as claimed in claim 1 mounted between the static element and the rotary element.

* * * * *